S. MAY.
SAUSAGE CASING.
APPLICATION FILED MAR. 7, 1912.
1,036,290. Patented Aug. 20, 1912.
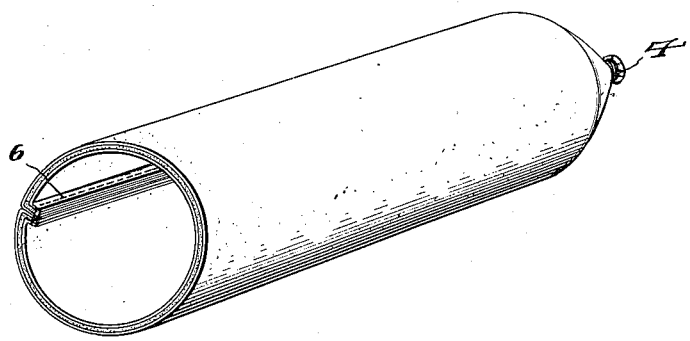
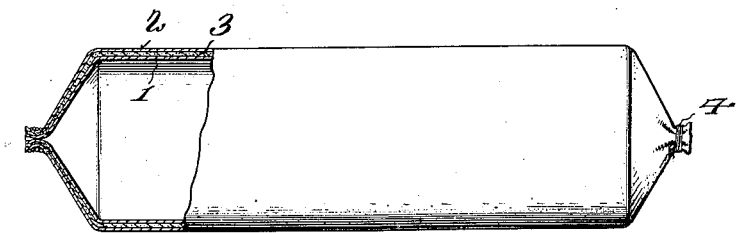
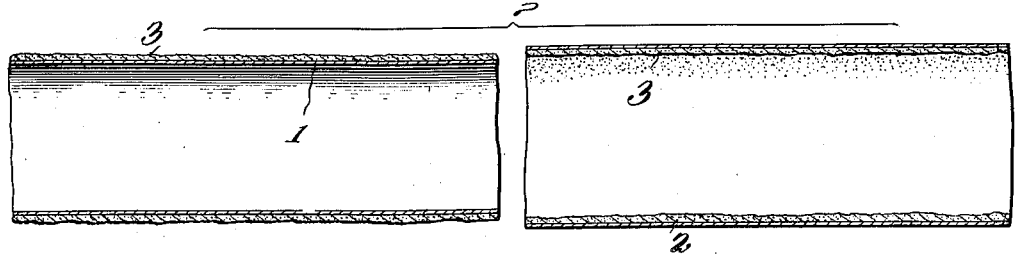
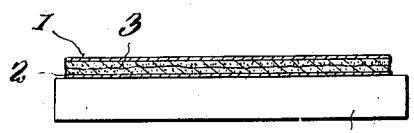
Inventor
Solomon May
Witnesses
By Sturtevant & Mason
Attorneys

UNITED STATES PATENT OFFICE.

SOLOMON MAY, OF CHICAGO, ILLINOIS.

SAUSAGE-CASING.

1,036,290.

Specification of Letters Patent. Patented Aug. 20, 1912.

Application filed March 7, 1912. Serial No. 682,310.

*To all whom it may concern:*

Be it known that I, SOLOMON MAY, a citizen of the United States, residing at Chicago, in the county of Cook, State of Illinois, have invented certain new and useful Improvements in Sausage-Casings, of which the following is a description, reference being had to the accompanying drawing and to the figures of reference marked thereon.

My invention relates to an improvement in sausage casings, and consists in the matters hereinafter described and referred to in the appended claims.

The invention is illustrated in the accompanying drawings, in which,—

Figure 1 is a perspective view of a sausage casing constructed in accordance with my invention; Figs. 2 and 3 are sectional views illustrating the manner of forming the same; and Fig. 4 is a view of a modified way of forming the same.

In these drawings, as shown in Fig. 2, I first take the intestines 1, 2, after they have been cured in salt and soak them in water, rendering them soft and pliable. The fat is then removed by scraping, but on the interior surface there is still left a layer of slimy material 3. I then turn one intestine inside out, as shown on the left of Fig. 2, and slip it inside the other. I then tie one end of the double casing as at 4, and distend the same by blowing up from the other end, and tie that end, leaving them in this condition, (see Fig. 3), until dry. During this drying operation, the slimy surfaces in contact set, and when dry hold the material in stretched condition.

As shown in Fig. 4, instead of distending by use of air and then drying, I may cut the intestines open and stretch the two thicknesses with their slimy edges in contact over a board or frame 5. When sufficiently stretched and dried, the ends may be trimmed off and the tube then severed lengthwise, the edges overlapped, or turned in and stitched, as at 6, on a machine, preferably in tapered form, as shown in Fig. 1, and the tapered tube is then cut into lengths suitable for the length of sausage desired.

I do not claim herein the method of making sausage casings, as that forms the subject matter of an application filed by me of even date herewith, Serial No. 682,311.

While in this application and the companion application, I have shown and described the sausage casing as made of intestine material, it will be understood that I do not desire to be limited to this special material, as any of the membranes ordinarily used for sausage casings may be treated and made up in a similar manner.

Having thus described my invention, what I claim as new and desire to secure by Letters Patent, is:—

1. The herein described sausage casing, composed of two layers of intestine material, with their slimy surfaces in contact and dried, and with their edges stitched longitudinally.

2. The herein described sausage casing, composed of intestines, with their inner walls in contact and adhering and with their longitudinal edges stitched together.

In testimony whereof, I affix my signature, in the presence of two witnesses.

SOLOMON MAY.

Witnesses:
 JAMES S. AGAR,
 JNO. W. BURNS.